United States Patent
Baba

(10) Patent No.: US 8,641,376 B2
(45) Date of Patent: Feb. 4, 2014

(54) WIND TURBINE AND METHOD OF DEICING WIND TURBINE BLADE

(75) Inventor: Mitsuya Baba, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 823 days.

(21) Appl. No.: 12/672,309

(22) PCT Filed: Aug. 19, 2009

(86) PCT No.: PCT/JP2009/064523
§ 371 (c)(1),
(2), (4) Date: Jun. 10, 2010

(87) PCT Pub. No.: WO2011/021287
PCT Pub. Date: Feb. 24, 2011

(65) Prior Publication Data
US 2011/0182732 A1    Jul. 28, 2011

(51) Int. Cl.
*F01P 7/06* (2006.01)

(52) U.S. Cl.
USPC ............................................. 416/39

(58) Field of Classification Search
USPC ................. 415/118; 416/39, 41, 61
See application file for complete search history.

(56) References Cited

U.S. PATENT DOCUMENTS

| | | | |
|---|---|---|---|
| 5,315,159 A | 5/1994 | Gribnau | |
| 6,890,152 B1 * | 5/2005 | Thisted | 416/1 |
| 7,905,701 B2 | 3/2011 | Matsushita | |
| 2004/0084527 A1 | 5/2004 | Bong et al. | |
| 2006/0018752 A1 | 1/2006 | LeMieux | |
| 2007/0041837 A1 | 2/2007 | Ide et al. | |
| 2007/0110578 A1 * | 5/2007 | Stommel | 416/132 B |
| 2007/0154310 A1 | 7/2007 | Wobben | |
| 2008/0317583 A1 * | 12/2008 | Grabau | 415/4.3 |
| 2009/0039650 A1 * | 2/2009 | Nies | 290/44 |
| 2010/0066088 A1 | 3/2010 | Matsushita | |

FOREIGN PATENT DOCUMENTS

| | | | |
|---|---|---|---|
| JP | 2004084527 A | 3/2004 | |
| JP | 200583308 | 3/2005 | |
| JP | 2005083308 A | 3/2005 | |
| JP | 2006514190 A | 4/2006 | |
| JP | 2006528307 A | 12/2006 | |
| TW | 200916652 A | 4/2009 | |
| TW | 200920938 A | 5/2009 | |
| WO | 2008135789 A2 | 11/2008 | |
| WO | 2009043352 A2 | 4/2009 | |
| WO | WO 2009043352 A2 * | 4/2009 | F03D 7/02 |

OTHER PUBLICATIONS

Notice of Allowance corresponding to KR2010-7021913, dated Apr. 24, 2012.

(Continued)

*Primary Examiner* — Nathaniel Wiehe
*Assistant Examiner* — Su Htay
(74) *Attorney, Agent, or Firm* — Kanesaka Berner & Partners, LLP

(57) ABSTRACT

A wind turbine is provided with a rotor including a plurality of blades and a deicing unit. The deicing unit performs a deicing operation only on one(s) of the plurality of blades, which has an azimuth angle within a predetermined range. The predetermined range is within a range from 90 to 270 degrees, and includes 180 degrees. Therefore, ice scattering is suppressed in deicing the wind turbine blades.

16 Claims, 5 Drawing Sheets

(56) References Cited

OTHER PUBLICATIONS

Office Action corresponding to JP2010-505496, dated May 21, 2012.
Canadian Office Action, dated Jul. 19, 2012 issued in CA Application No. 2,715,935.
Australian Office Action for 2009342697, mailed Mar. 23, 2011.
Notification on the Grant of Patent issued Apr. 7, 2013 corresponds to Chinese patent application No. 200980111882.6.
Notice of Acceptance dated Apr. 16, 2012 corresponds to Australian patent application No. 2009342697.
Approval Decision Letter issued Jul. 27, 2012 corresponds to Taiwanese patent application No. 098128301.
IPRP issued Mar. 13, 2012 corresponds to PCT/JP2009/064523.
Notice of Allowance as mailed on May 21, 2013 in corresponding Canadian Application No. 2715935.
Notification of the decision to grant a patent mailed Sep. 5, 2013, corresponds to Japanese patent application No. 2010-505496.

* cited by examiner

WIND TURBINE AND METHOD OF DEICING WIND TURBINE BLADE

RELATED APPLICATIONS

The present application is national phase of, and claims priority from, International Application Number PCT/JP2009/064523 filed Aug. 19, 2009, the disclosure of which is hereby incorporated by reference herein in its entirety.

TECHNICAL FIELD

The present invention relates to a wind turbine and a method of deicing a wind turbine blade.

BACKGROUND ART

There have been conventionally developed various deicing methods to prevent deterioration, of performances of a wind turbine due to adhesion of ice to the wind turbine.

US Patent Application Publication No. 2006/0018752 discloses a method of deicing a wind turbine blade by flowing the air heated by a heater in a channel provided through the wind turbine blade and a method of detecting ice adhering to the wind turbine blade. A thermographic system is used to detect the ice.

U.S. Pat. No. 6,890,152 discloses a method of detecting adhesion of ice to a wind turbine blade, vibrating at least a portion of the wind turbine blade, and shaking down the ice from the wind turbine blade. For example, a vibrator provided in the wind turbine blade generates acoustic wave to vibrate the wind turbine blade. The frequency of the acoustic wave is 5 to 500 Hz.

Japanese Unexamined Patent Publication No. 2004-84527 discloses an ice adhesion preventing operation control device for the wind turbine. The rotor of the wind turbine includes pitch-variable blades. The ice adhesion preventing operation control device for the wind turbine issues an instruction to reduce the pitch angle of each blade down to a predetermined pitch angle when a temperature is equal to or lower than a threshold value, a humidity is equal to or higher than a predetermined threshold value, a wind velocity is equal to or lower than a predetermined threshold value, and the wind turbine is stopped or in an idling or standby state. After issuing the pitch angle reducing instruction, the ice adhesion preventing operation control device for the wind turbine issues an instruction to actuate a main shaft brake connected to the rotor when the rotational velocity of the rotor is equal to or higher than a predetermined threshold value.

CITATION LISTS

Patent Literature

Patent Document 1: US Patent Application Publication No. 2006/0018752
Patent Document 2: U.S. Pat. No. 6,890,152
Patent Document 3: Japanese Unexamined Patent Publication No. 2004-84527

SUMMARY OF THE INVENTION

It is an object of the present invention to provide a wind turbine and a method of deicing a wind turbine blade for suppressing ice scattering in deicing the wind turbine blade.

In a first aspect of the present invention, a wind turbine is provided with a rotor including a plurality of blades and a deicing unit. Said deicing unit performs a deicing operation only on one(s) of said plurality of blades, which has an azimuth angle within a predetermined range. Said predetermined range is within a range from 90 to 270 degrees, and includes 180 degrees.

Said deicing unit preferably includes a pitch angle controller independently controlling rotations of said plurality of blades around respective pitch axes. In said deicing operation, said pitch angle controller applies a rotational vibration to said one(s) of said plurality of blades around a pitch axis of said one(s) of said plurality of blades.

Said pitch angle controller preferably controls said rotational vibration so that a frequency of said rotational vibration is an integer multiple of a resonance frequency of a vibration in a flap direction of said one(s) of said plurality of blades, the integer being equal to or greater than 1.

Said deicing unit preferably includes an azimuth angle detection unit. Said plurality of blades includes a first blade. Said azimuth angle detection unit detects a first azimuth angle of said first blade. Said pitch angle controller applies the rotational vibration to said first blade around the pitch axis of said first blade when said first azimuth angle falls in said predetermined range. Said pitch angle controller keeps the pitch angle of said first blade constant when said first azimuth angle does not fall in said predetermined range.

Said deicing unit preferably includes: a pitch angle controller independently controlling rotations of said plurality of blades around respective pitch axes; and an acoustic generator provided on a tower supporting said rotor. In said deicing operation, said pitch angle controller holds said one(s) of said plurality of blades in a fine state or an inversion state in which the pitch angle thereof differs in 180 degrees from that of the fine state, and said acoustic generator outputs acoustic wave to said one(s) of said plurality of blades.

Said deicing unit preferably includes an azimuth angle detection unit detecting an azimuth angle of each of said plurality of blades. Said plurality of blades includes a first blade. Said pitch angle controller holds said first blade in a fine state or an inversion state in which a pitch angle thereof differs in 180 degrees from that of the fine state when a first azimuth angle of said first blade falls in said predetermined range, and holds said first blade in a feathering state, a state between the fine state and the feathering state or a state between the inversion state in which the pitch angle thereof differs in 180 degrees from that of the fine state and the feathering state when said first azimuth angle does not fall in said predetermined range.

Said acoustic generator preferably does not output the acoustic wave when none of said plurality of blades has an azimuth angle within said predetermined range.

The frequency of said acoustic wave is preferably an integer multiple of a resonance frequency of said one(s) of said plurality of blades, the integer being equal to or greater than 1.

Said deicing unit preferably includes an icing detection unit. Said deicing unit performs said deicing operation when said icing detection unit detects icing on said rotor.

Said deicing unit preferably stops performing said deicing operation when said icing detection unit does not detect the icing on said rotor.

Said deicing unit preferably includes a weather condition detection unit. Said deicing unit performs said deicing operation when said weather condition detection unit detects a predetermined weather condition.

Said deicing unit preferably performs said deicing operation regularly.

In a second aspect of the present invention, a wind turbine blade deicing method includes performing a deicing operation only on one(s) of a plurality of blades provided for a rotor of a wind turbine, which has an azimuth angle falling in a predetermined range. Said predetermined range is within a range from 90 to 270 degrees, and includes 180 degrees.

Said performing said deicing operation preferably includes applying a rotational vibration to said one(s) of said plurality of blades around a pitch axis thereof.

The above-described wind turbine blade deicing method preferably further includes: detecting a first azimuth angle of a first blade out of said plurality of blades during rotation of the rotor; applying a rotational vibration around a pitch axis of the first blade to the first blade when the first azimuth angle falls in the predetermined range; and keeping the pitch angle of the first blade constant when the first azimuth angle does not fall in the predetermined range.

Said performing said deicing operation preferably includes causing an acoustic generator provided on a tower supporting said rotor to output acoustic wave to said one(s) of said plurality of blades while holding said one(s) of said plurality of blades in a fine state or an inversion state in which a pitch angle thereof differs in 180 degrees from that of the fine state.

The above-described wind turbine blade deicing method preferably further includes: detecting a first azimuth angle of a first blade out of said plurality of blades during rotation of said rotor; holding said first blade in a fine state or an inversion state in which a pitch angle thereof differs in 180 degrees from that of the fine state when said first azimuth angle falls in said predetermined range; and holding said first blade in a feathering state, a state between the fine state and the feathering state or a state between the inversion state in which the pitch angle thereof differs in 180 degrees from that of the fine state and the feathering state when said first azimuth angle does not fall in said predetermined range.

Said acoustic generator preferably does not output the acoustic wave when none of said plurality of blades has an azimuth angle within said predetermined range.

Said deicing operation is preferably performed in a state in which said rotor is stopped.

Said deicing operation is preferably performed when icing on said rotor is detected.

The wind turbine blade deicing method preferably further includes: stopping performing said deicing operation when the icing on said rotor is not detected.

Said deicing operation is preferably performed when a predetermined weather condition is detected.

Said deicing operation is preferably performed regularly.

The present invention provides a wind turbine and the method of deicing a wind turbine blade, which suppresses ice scattering in deicing the wind turbine.

BRIEF DESCRIPTION OF DRAWINGS

The above object, the other objects, effects, and features of the present invention will be readily apparent from description of embodiments in conjunction with the accompanying drawings.

DESCRIPTION OF EMBODIMENTS

A description is given below of a wind turbine and a method of deicing a wind turbine blade according to embodiments of the present invention with reference to the accompanying drawings.

First Embodiment

Figure 1:
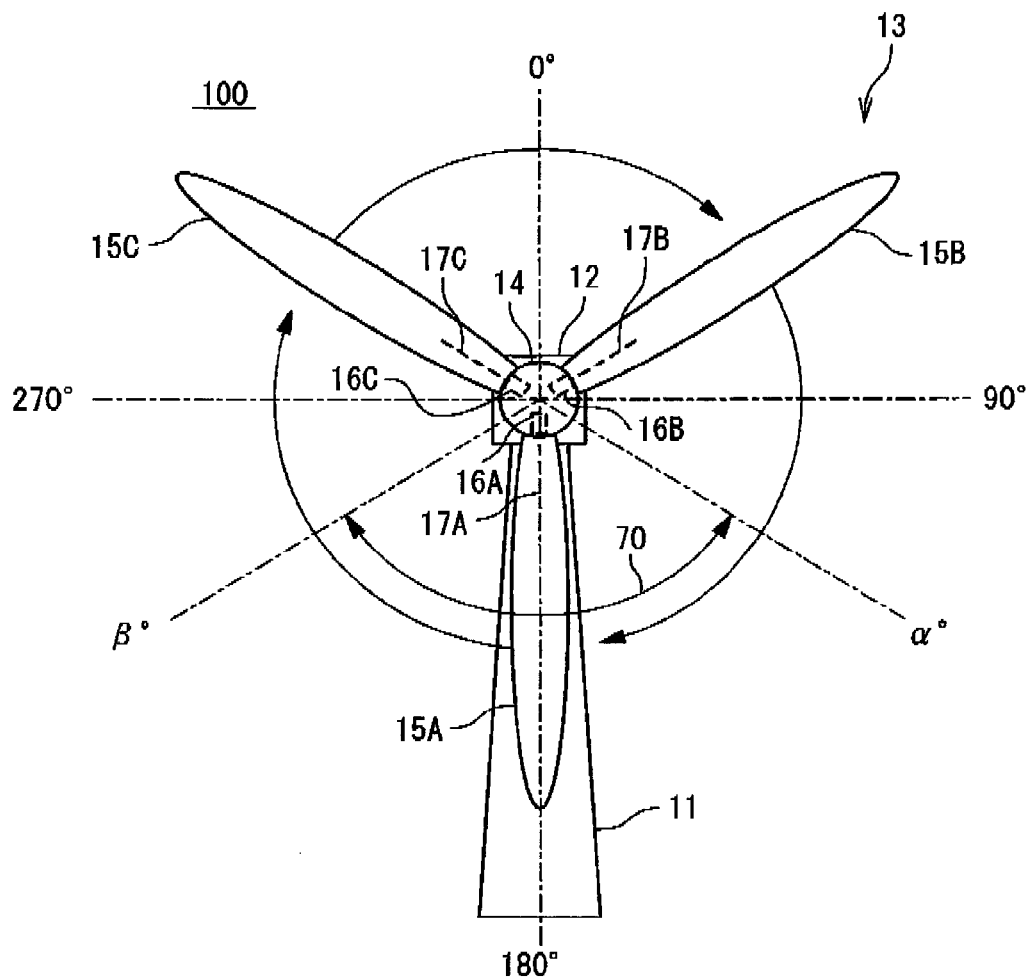
FIG. 1 is a front view of a wind turbine in a first embodiment of the present invention.

FIG. 1 shows a wind turbine 100 in a first embodiment of the present invention. The wind turbine 100 includes a tower 11, a nacelle 12, and a rotor 13. The nacelle 12 is attached on the top of the tower 11. The nacelle 12 rotatably supports the rotor 13. Accordingly, the tower 11 supports the rotor 13 via the nacelle 12. The rotational axis of the rotor 13 is horizontal or generally horizontal. The rotor 13 includes a hub 14 and blades 15A to 15C. The hub 14 is located on the rotational axis of the rotor 13. The blades 15A to 15C are arranged around the hub 14 with equal intervals. Although an instance is described here in which the number of the blades of the rotor 13 is three, the number of the blades may be two or four or more. The blade roots of the blades 15A to 15C are attached to the hub 14. The hub 14 includes pitch angle actuators 16A to 16C. The pitch angle actuators 16A to 16C drive the blades 15A to 15C to rotate around the pitch axes 17A to 17C, respectively. That is, the pitch angle actuators 16A to 16C control the pitch angles of the blades 15A to 15C, respectively.

The rotor 13 is rotated in the arrow direction shown in FIG. 1 when receiving wind. The wind turbine 100 generates power using the rotation of the rotor 13. The azimuth angles of the blades 15A to 15C vary, when the rotor 13 is rotated. When the blade 15A is located right on the hub 14, the azimuth angle of the blade 15A is zero degree. When the rotor 13 is rotated by 90 degrees in the arrow direction from the state in which the azimuth angle of the blade 15A is zero degree, the azimuth angle of the blade 15A reaches 90 degrees. When the rotor 13 is rotated by 90 degrees in the arrow direction from the state in which the azimuth angle of the blade 15 is 90 degrees, the azimuth angle of the blade 15A reaches 180 degrees. When the azimuth angle of the blade 15A is 180 degrees, the blade 15A is located right under the hub 14 and overlaps with the tower 11 if viewed in the direction of the rotational axis of the rotor 13. When the rotor 13 is rotated by 90 degrees in the arrow direction from the states in which the azimuth angle of the blade 15A is 180 degree, the azimuth angle of the blade 15A reaches 270 degrees. When the blade 15A is rotated by 90 degrees in the arrow direction from the state in which the azimuth angle of the blade 15A is 270 degrees, the azimuth angle of the blade 15A returns to zero degree. The azimuth angles of the blades 15B and 15C are defined similarly to that of the blade 15A.

Figure 2:
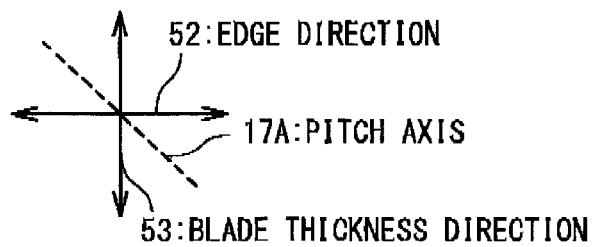
FIG. 2 shows relations among the pitch axis, the edge direction, the blade thickness direction, the pitch-axis rotational vibration, and the flap-direction vibration, with respect to a blade.

FIG. 2 shows relationship among the pitch axis 17A, an edge direction 52, a blade thickness direction 53, a pitch-axis rotational vibration, and a flap-direction vibration with respect to the blade 15A. The pitch axis 17A, the edge direction 52, and the blade thickness direction 53 are perpendicular to one another. The edge direction means the chord direction of the blade 15A. The blade thickness direction 53 means the thickness direction of the blade 15A. The pitch-axis rotational vibration means a rotational vibration of the blade 15A around the pitch axis 17A. The flap-direction vibration means a vibration of the blade 15A in the plane defined by the pitch axis 17A and the blade thickness direction 53. The edge directions, blade thickness directions, pitch-axis rotational vibrations, and flap-direction vibrations of the blades 15B and 15C are defined similarly to the blade 15A.

Figure 3:
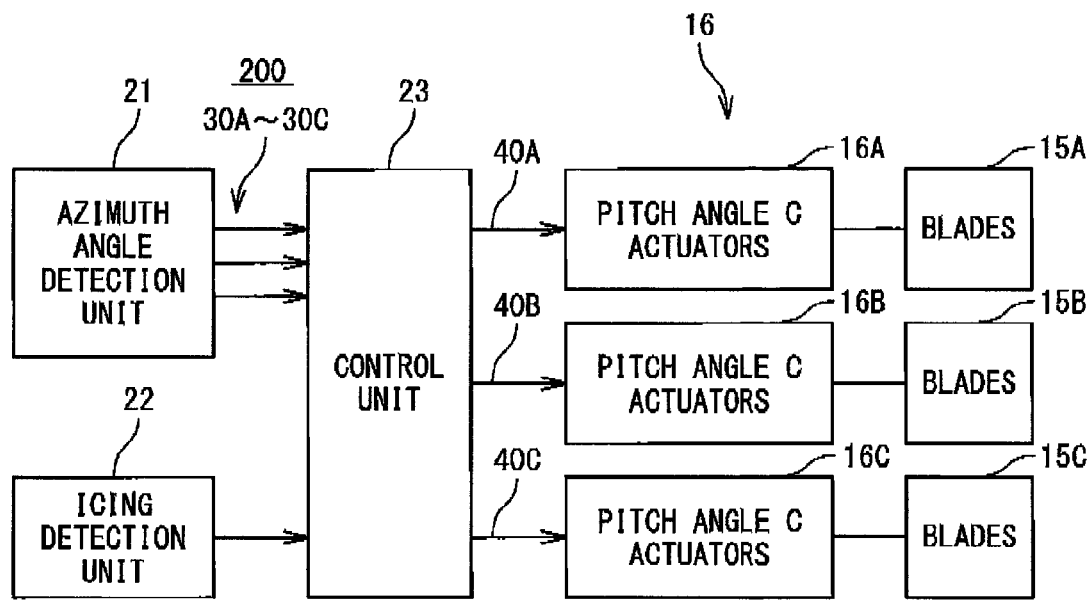
FIG. 3 is a block diagram of a deicing unit in the first embodiment.

Referring to FIG. 3, the wind turbine 100 includes a deicing unit 200. The deicing unit 200 includes an azimuth angle detection unit 21, an icing detection unit 22, a control unit 23, a pitch angle control unit 16, and the blades 15A to 15C. The pitch angle control unit 16 includes pitch angle actuators 16A to 16C. Since the pitch angle actuators 16A to 16C are provided to correspond to the blades 15A to 15C, respectively, the pitch angle control unit 16 can control the rotations of the blades 15A to 15C around the pitch axes 17A to 17C independently.

The azimuth angle detection unit 21 outputs an azimuth angle signal 30A indicating the azimuth angle of the blade 15A, an azimuth angle signal 30B indicating the azimuth angle of the blade 15B, and an azimuth angle signal 30C indicating the azimuth angle of the blade 15C to the control unit 23. For example, the azimuth angle detection unit 21 includes a sensor that detects the azimuth angle of the blade 15A, a sensor that detects the azimuth angle of the blade 15B, and a sensor that detects the azimuth angle of the blade 15C. Alternatively, the azimuth angle detection unit 21 may include a sensor that detects the azimuth angle of a predetermined region of the rotor 13 and an arithmetic operation unit that detects the azimuth angles of the blades 15A to 15C on the basis of the azimuth angle of the predetermined region by calculation.

The icing detection unit 22 detects icing on the blades 15A to 15C on the basis of, for example, images of the blades 15A to 15C, respectively. The icing detection unit 22 may detect icing on the blades 15A to 15C based on the load on each blade, the unbalance among the loads on the respective blades or the dissociation of the actual output from the estimated output at a predetermined wind velocity and pitch angle.

The control unit 23 outputs a pitch angle control signal 40A to the pitch angle actuator 16A, a pitch angle control signal 40B to the pitch angle actuator 16B, and a pitch angle control signal 40C to the pitch angle actuator 16C. The pitch angle actuator 16A changes the pitch angle of the blade 15A or keeps the pitch angle thereof constant based on the pitch angle control signal 40A. The pitch angle actuator 16B changes the pitch angle of the blade 15B or keeps the pitch angle thereof constant based on the pitch angle control signal 40B. The pitch angle actuator 16C changes the pitch angle of the blade 15C or keeps the pitch angle thereof constant based on the pitch angle control signal 40C.

A predetermined range θ of the azimuth angle is set in the control unit 23. As shown in FIG. 1, the predetermined range θ is defined as a range from α to β degrees. α is equal to or greater than 90 degrees and equal to or smaller than 180 degrees. β is equal to or greater than 180 degrees and equal to or smaller than 270 degrees. Therefore, the predetermined range θ of the azimuth angle falls in a range from 90 to 270 degrees and includes 180 degrees.

Hereinafter, a description is given of a method of deicing a wind turbine blade in the first embodiment.

When the icing detection unit 22 detects icing on any of the blades 15A to 15C, the deicing unit 200 executes the following operation: The deicing unit 200 executes the following operation in a state in which the rotor 13 is rotating.

The deicing unit 200 performs the deicing operation only on one(s) of the blades 15A to 15C which has an azimuth angle within the predetermined range θ. It should be noted that "to perform the deicing operation" means to include that the pitch angle control unit 16 applies a rotational vibration to the relevant blade around the pitch axis thereof.

Details of the deicing operation will be described in the following:

The control unit 23 monitors the azimuth angles of the blades 15A to 15C based on the azimuth angle signals 30A to 30C, respectively.

Figure 4:
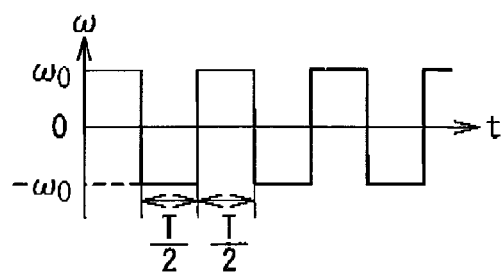
FIG. 4 is a graph showing the waveform of a pitch angle control signal outputted by a control unit of the deicing unit of the first embodiment to a pitch angle actuator.

When the azimuth angle of the blade 15A falls in the predetermined range θ, the control unit 23 outputs the pitch angle control signal 40A indicating the waveform of the pitch angle velocity ω shown in FIG. 4 to the pitch angle actuator 16A. According to the waveform of FIG. 4, the pitch angle velocity ω alternately repeats a state of being constantly $\omega_0$ for time T/2 and a state of being constantly $-\omega_0$ for time T/2. The pitch angle actuator 16A applies the rotational vibration around the pitch angle 17A to the blade 15A based on the pitch angle control signal 40A indicating the waveform of FIG. 4. The blade 15A is thereby vibrated to shake down the ice from the blade 15A.

The operation performed when the azimuth angle of the blade 15B falls in the predetermined range θ and the operation performed when the azimuth angle of the blade 15C falls in the predetermined range θ are same as the above-stated operation performed when the azimuth angle of the blade 15A falls in the predetermined range θ.

When the azimuth angle of the blade 15A does not fall in the predetermined range θ, the control unit 23 outputs the pitch angle control signal 40A indicating a constant pitch angle to the pitch angle actuator 16A. It should be noted that the constant pitch angle is a pitch angle corresponding to the feathering state or a pitch angle corresponding to a state near the feathering state. The pitch angle actuator 16A keeps the pitch angle of the blade 15A constant based on the pitch angle control signal 40A indicating the constant pitch angle.

The operation performed when the azimuth angle of the blade 15B does not fall in the predetermined range θ and the operation performed when the azimuth angle of the blade 15C does not fall in the predetermined range θ are similar to the above-stated operation performed when the azimuth angle of the blade 15A does not fall in the predetermined range θ.

The deicing unit 200 stops performing the above-stated operation when the icing detection unit 22 does not detect icing on the blades 15A to 15C.

In this embodiment, the deicing unit 200 performs the deicing operation only on the blade having the azimuth angle that falls in the range from 90 to 270 degrees. Therefore, the ice shaken down from the blades by the deicing operation is suppressed from scattering in a wide range. In particular, the deicing unit 200 does not perform the deicing operation on the blade located at a higher position than the nacelle 12, and this prevents the nacelle 12 from being damaged by the ice shaken down from the blades by the deicing operation.

Furthermore, since the blade on which the deicing unit 200 does not perform the deicing operation is kept in the featuring state or a state near the feathering state, the rotor 13 is prevented from rotating at a high velocity. Therefore, the time required for each blade to pass through the predetermined angle θ of the azimuth angle is prolonged, and this allows strongly vibrating the blade.

The deicing unit 200 stops performing the deicing operation when the icing detection unit 22 does not detect icing on the blades 15A to 15C, and this prevents the deicing operation from being performed uselessly in a state in which there is no ice on the blades 15A to 15C.

Moreover, it is possible to strongly vibrate the blades 15A to 15C, when the pitch angle actuators 16A to 16C control the rotational vibrations of the blades 15A to 15C so that the frequencies of the rotational vibrations applied to the blades 15A to 15C are integer multiples of the resonance frequencies of the blades 15A to 15C, where the integer is equal to or greater than 1, respectively. The resonance frequency is also referred to as "natural frequency". The resonance frequency of the blades 15A to 15C is, for example, the resonance frequency at which the blades 15A to 15C make torsional vibrations or that at which the blades 15A to 15C vibrate in the flap directions.

In this embodiment, it is possible to deice the blades 15A to 15C without providing a deicing-dedicated device such as a heater.

In this embodiment, the pitch angle actuators 16A to 16C control the blades 15A to 15C to make reciprocally rotational motions around the pitch axes 17A to 17C, thereby regularly applying shocks (high accelerations) to the blades 15A to 15C, respectively. These shocks separate ice from the blades 15A to 15C. It should be noted that the waveform of the pitch angle velocity ω is not limited to the rectangular waveform shown in FIG. 4. As long as sufficiently high pitch angle accelerations can be applied to the blades 15A to 15C, the pitch angle actuators 16A to 16C may control the blades 15A to 15C to make reciprocally rotational motions around the pitch axes 17A to 17C so that the pitch angle velocities change in sinusoidal fashions, respectively.

In the following, a method of deicing a wind turbine blade according to a modification of the first embodiment will be described.

The deicing unit 200 performs the following operation when the icing detection unit 22 detects icing on the blades 15A to 15C.

The control unit 23 outputs the pitch angle control signal 40A indicating the waveform of FIG. 4 to the pitch angle actuator 16A in a state in which the rotor 13 is stopped at the position at which the azimuth angle of the blade 15A is 180 degrees. The pitch angle actuator 16A applies a rotational vibration around the pitch axis 17A to the blade 15A based on the pitch angle control signal 40A indicating the waveform of FIG. 4. The blade 15A thereby vibrates and shakes down ice from the blade 15A.

The deicing unit 200 deices the blades 15B and 15C similarly to the deicing operation for the blade 15A.

The deicing unit 200 stops performing the above-stated operation when the icing detection unit 22 does not detect icing on the blades 15A to 15C.

In the modification of the first embodiment, it is also possible to strongly vibrate the blades 15A to 15C, when the pitch angle actuators 16A to 16C control the rotational vibrations of the blades 15A to 15C so that the frequency of the rotational vibrations applied to the blades 15A to 15C is an integer multiple of the resonance frequency of the blades 15A to 15C, where the integer is equal to or greater than 1.

Second Embodiment

Figure 5:
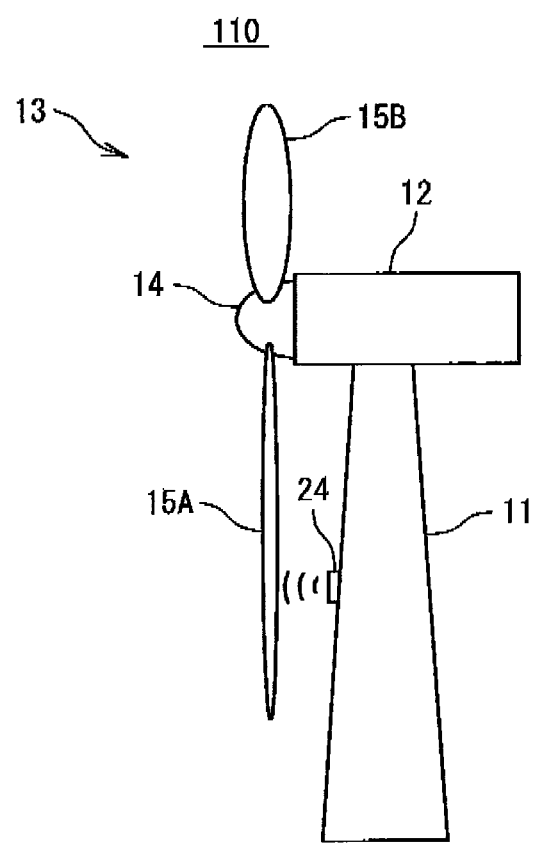
FIG. 5 is a side view of a wind turbine in a second embodiment of the present invention.

FIG. 5 shows a wind turbine 110 in a second embodiment of the present invention. The wind turbine 110 is configured so that an acoustic generator 24 is added to the wind turbine 100 of the first embodiment. The acoustic generator 24 is provided on the tower 11.

Figure 6:
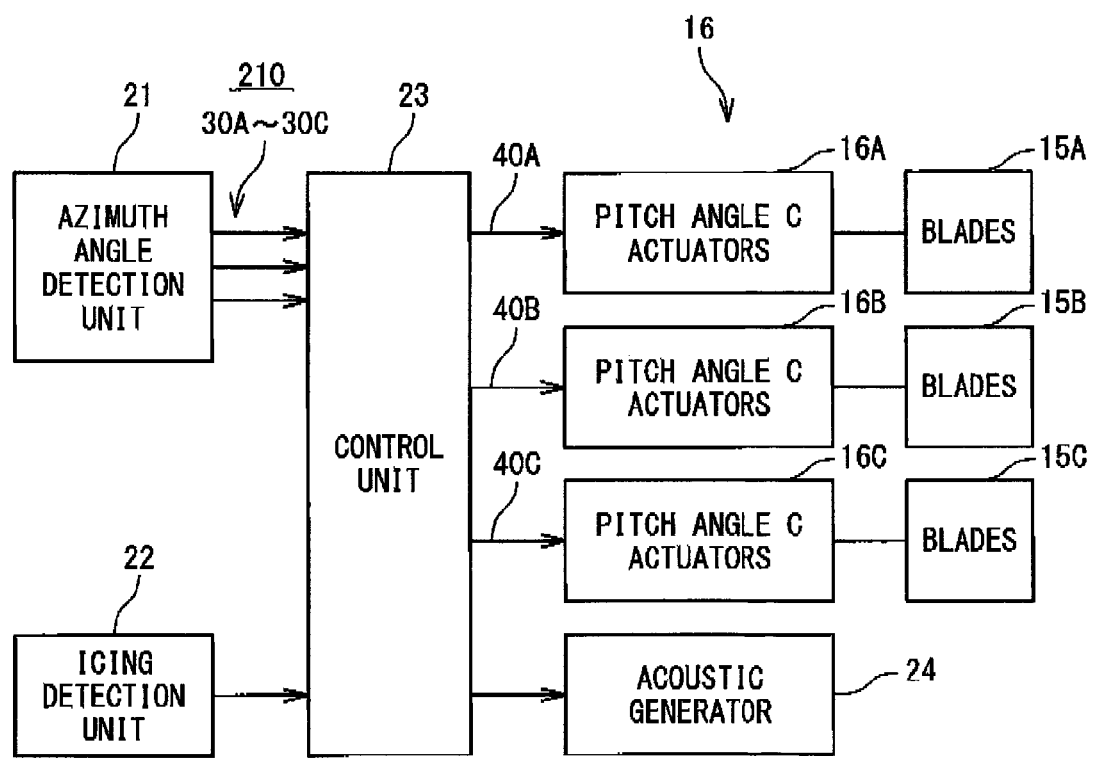
FIG. 6 is a block diagram of a deicing unit in the second embodiment.

Referring to FIG. 6, the wind turbine 110 includes a deicing unit 210. The deicing unit 210 is configured so that the acoustic generator 24 is added to the deicing unit 200.

In the following, a description is given of a method of deicing a wind turbine blade in the second embodiment.

If the icing detection unit 22 detects icing on the blades 15A to 15C, the deicing unit 210 performs the following operation. The deicing unit 210 performs the following operation in a state in which the rotor 13 is rotating.

The deicing unit 210 performs the deicing operation only on one of the blades 15A to 15C having an azimuth angle within the predetermined range θ. It should be noted that "to perform the deicing operation" means to include that the pitch angle control unit 16 holds the relevant blade in the fine state or the inversion state in which the pitch angle thereof differs from that of the fine state by 180 degrees, and the acoustic generator 24 outputs acoustic wave to the blade.

Details of the deicing operation will be described below.

The control unit 23 monitors the azimuth angles of the blades 15A to 15C based on the azimuth angle signals 30A to 30C, respectively. The control unit 23 controls the acoustic generator 24 to continuously output acoustic waves. Since the acoustic generator 24 is provided on the tower 11, the acoustic generator 24 applies strong vibration energy to the blade at a position at which the azimuth angle of the blade is 180 degrees or a position near the position. However, the acoustic generator 24 hardly applies vibration energy to blades at positions far away from the position at which the azimuth angle is 180 degrees.

When the azimuth angle of the blade 157 falls in the predetermined range θ, the control unit 23 outputs the pitch angle control signal 40A indicating the pitch angle of the fine state or that of the inversion state to the pitch angle actuator 16A. The pitch angle actuator 16A holds the blade 15A in the fine state or the inversion state based on the pitch angle control signal 40A indicating the pitch angle of the fine state or the inversion state. By receiving the acoustic wave from the acoustic generator 24, the blade 15A is vibrated to shake down ice from the blade 15A. Since the blade 15A is in the fine state or the inversion state, the blade 15A receives the acoustic wave with a wide area.

The operation performed when the azimuth angle of the blade 15B falls in the predetermined range θ and the operation performed when the azimuth angle of the blade 15C falls in the predetermined range θ are similar to the above-stated operation performed when the azimuth angle of the blade 15A falls in the predetermined range θ.

When the azimuth angle of the blade 15A does not fall in the predetermined range θ, the control unit 23 outputs the pitch angle control signal 40A indicating a constant pitch angle to the pitch angle actuator 16A. It should be noted that the constant pitch angle is a pitch angle corresponding to the feathering state or a pitch angle corresponding to a state near the feathering state. The state near the feathering state is a state between the feathering state and the fine state or a state between the feathering state and the inversion state. The pitch angle actuator 16A holds the blade 15A in the feathering state or the state near the feathering state based on the pitch angle control signal 40A indicating the constant pitch angle. Since the blade 15A is in the feathering state or the state near the feathering state and located at the position away from the position at which the azimuth angle is 180 degrees, the blade 15A does not vibrate by the acoustic wave from the acoustic generator 24.

The operation performed when the azimuth angle of the blade 15B does not fall in the predetermined range θ and the operation performed when the azimuth angle of the blade 15C does not fall in the predetermined range θ are similar to the above-stated operation performed when the azimuth angle of the blade 15A does not fall in the predetermined range θ.

The deicing unit 210 stops performing the above-stated operation when the icing detection unit 22 does not detect icing on the blades 15A to 15C.

In this embodiment, the deicing unit 210 performs the deicing operation only on the blade located at the position at which the azimuth angle is 180 degrees or the position near the position at which the azimuth angle is 180 degrees. Therefore, the ice shaken down from the blades due to the deicing operation is suppressed from scattering in a wide range. In particular, the deicing unit 210 does not perform the deicing operation on the blade located at a higher position than the nacelle 12, and this prevents the nacelle 12 from being damaged by the ice shaken down from the blades due to the deicing operation.

Furthermore, since the blade on which the deicing unit 210 does not perform the deicing operation is held in the feathering state or the state near the feathering state, the rotor 13 is prevented from rotating at a high velocity. Therefore, the time required for each blade to pass through the predetermined angle θ of the azimuth angle is prolonged, making it possible to strongly vibrate the blade.

When the icing detection unit 22 does not detect icing on the blades 15A to 15C, the deicing unit 210 stops performs the deicing operation, and this prevents the deicing operation from being performed uselessly in a state in which there is no ice on the blades 15A to 15C.

Moreover, it is possible to strongly vibrate the blades 15A to 15C, when the frequency of the acoustic wave outputted from the acoustic generator 24 is set to an integer multiple of the resonance frequency of the blades 15A to 15C, where an integer is equal to or greater than 1. The resonance frequency of the blades 15A to 15C is, for example, the resonance frequency at which the blades 15A to 15C make torsional vibrations or that at which the blades 15A to 15C vibrate in the flap directions.

Preferably, the control unit 23 controls the acoustic generator 24 not to output the acoustic wave when none of the blades 15A to 15C has an azimuth angle within the predetermined range θ. In this case, energy for generating the acoustic wave is reduced.

In the following, a description is given of a method of deicing a wind turbine blade in a modification of the second embodiment.

The deicing unit 210 performs the following operation when the icing detection unit 22 detects icing on the blades 15A to 15C.

The control unit 23 outputs the pitch angle control signal 40A indicating the pitch angle of the fine state or the inversion state to the pitch angle actuator 16A in a state in which the rotor 13 is stopped at the position at which the azimuth angle of the blade 15A is 180 degrees, and controls the acoustic generator 24 to output the acoustic wave. The pitch angle actuator 16A holds the blade 15A in the fine state or the inversion state based on the pitch angle control signal 40A indicating the pitch angle corresponding to the fine state or the inversion state. By receiving the acoustic wave from the acoustic generator 24, the blade 15A is vibrated to shake down ice from the blade 15A.

The deicing unit 210 deices the blades 15B and 15C similarly to the deicing operation for the blade 15A.

The deicing unit 210 stops performing the above-stated operation when the icing detection unit 22 does not detect icing on the blades 15A to 15C.

In the modification of the second embodiment, it is also possible to strongly vibrate the blades 15A to 15C when the frequency of the acoustic wave outputted from the acoustic generator 24 is set to an integer multiple of resonance frequency of the blades 15A to 15C, where the integer is equal to or greater than 1.

Third Embodiment

Figure 7:
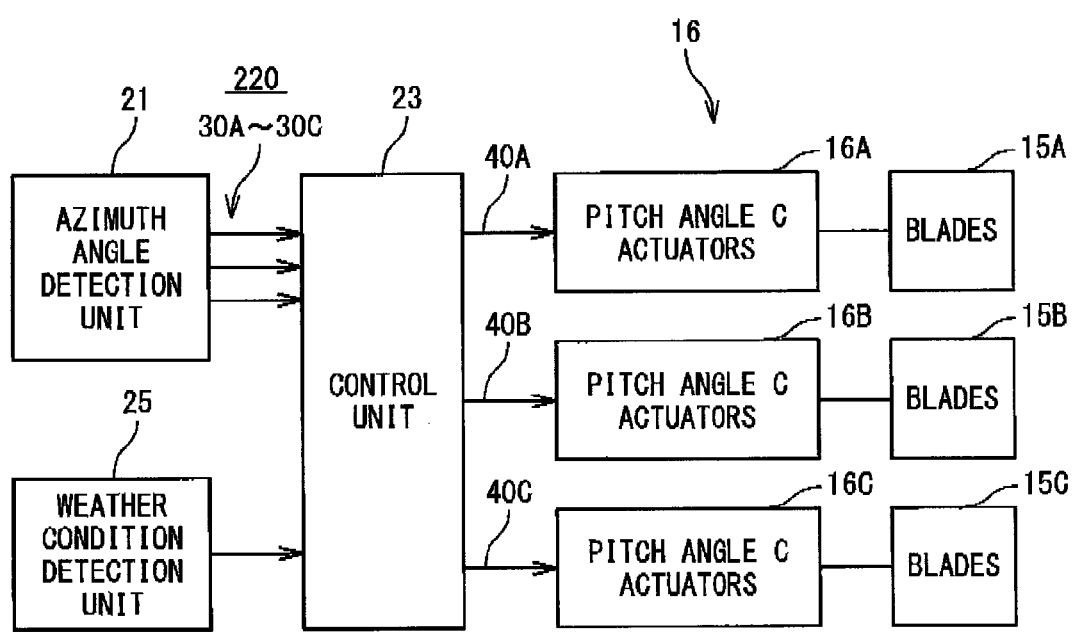
FIG. 7 is a block diagram of a deicing unit in a third embodiment of the present invention.

Referring to FIG. 7, a wind turbine of a third embodiment of the present invention is configured so that the deicing unit 200 of the wind turbine 100 of the first embodiment is replaced with a deicing unit 220. The deicing unit 220 is configured so that the icing detection unit 22 of the deicing unit 200 is replaced with a weather condition detection unit 25.

When the weather condition detection unit 25 detects a predetermined weather condition, the deicing unit 220 performs the operation performed by the deicing unit 200 according to the first embodiment or the operation performed by the deicing unit 200 of the modification of the first embodiment. In this case, the predetermined weather condition means a weather condition in which icing tends to occur, including, for example, a weather condition in which the temperature is equal to or lower than a predetermined threshold and the humidity is equal to or higher than a predetermined threshold.

The icing detection unit 22 may be replaced with the weather condition detection unit 25 in the deicing unit 210 of the second embodiment. When the weather condition detection unit 25 detects the predetermined weather condition, the deicing unit 210 performs the operation performed by the deicing unit 210 of the second embodiment or the operation performed by the deicing unit 210 of the modification of the second embodiment.

Furthermore, the operation performed by the deicing unit 200 of the first embodiment or that performed by the deicing unit 200, of the modification of the first embodiment may be performed regularly, and the operation performed by the deicing unit 210 of the second embodiment or that performed by the deicing unit 210 of the modification of the second embodiment may be performed regularly.

In each embodiment stated above, the wind turbine may be modified so that the control unit 23 detects the rotational velocity of the rotor 13 based on the changes in the azimuth angles of the blades 15A to 15C and so that the deicing operation is performed when the rotational velocity of the rotor 13 is equal to or lower than a predetermined threshold.

Although the present invention has been described so far while referring to the embodiments, the present invention is not limited to the above-stated embodiments. The above-stated embodiments may be variously changed or a combination of the above-stated embodiments may be implemented.

The invention claimed is:

1. A wind turbine, comprising:
   a rotor including a plurality of blades; and
   a deicing unit,
   wherein said deicing unit performs a deicing operation only on one or more of said plurality of blades, which has an azimuth angle within a predetermined range, and said predetermined range is within a range from 90 to 270 degrees,
   wherein said deicing unit includes:
   a pitch angle controller independently controlling rotations of said plurality of blades around respective pitch axes; and an acoustic generator provided on a tower supporting said rotor,
wherein, in said deicing operation, said pitch angle controller holds said one or more of said plurality of blades in a fine state or an inversion state in which the pitch angle thereof differs in 180 degrees from that of the fine state, and
wherein said acoustic generator outputs acoustic wave to said one or more of said plurality of blades.

2. The wind turbine according to claim 1, wherein said deicing unit includes
an azimuth angle detection unit detecting an azimuth angle of each of said plurality of blades,
said plurality of blades includes
a first blade,
said pitch angle controller holds said first blade in the fine state or the inversion state in which a pitch angle thereof differs in 180 degrees from that of the fine state when a first azimuth angle of said first blade falls in said predetermined range, and
said pitch angle controller holds said first blade in a feathering state, a state between the fine state and the feathering state or a state between the inversion state in which the pitch angle thereof differs in 180 degrees from that of the fine state and the feathering state when said first azimuth angle does not fall in said predetermined range.

3. The wind turbine according to claim 1, wherein said acoustic generator does not output the acoustic wave when none of said plurality of blades has an azimuth angle within said predetermined range.

4. The wind turbine according to claim 1, wherein a frequency of said acoustic wave is an integer multiple of a resonance frequency of said one or more of said plurality of blades, the integer being equal to or greater than 1.

5. The wind turbine according to claim 1, wherein said deicing unit includes an icing detection unit, and
said deicing unit performs said deicing operation when said icing detection unit detects icing on said rotor.

6. The wind turbine according to claim 5, wherein said deicing unit stops performing said deicing operation when said icing detection unit does not detect the icing on said rotor.

7. The wind turbine according to claim 1, wherein said deicing unit includes a weather condition detection unit,
wherein said deicing unit performs said deicing operation when said weather condition detection unit detects a predetermined weather condition.

8. The wind turbine according to claim 1, wherein said deicing unit performs said deicing operation regularly.

9. A wind turbine blade deicing method, comprising:
performing a deicing operation only on one or more of a plurality of blades provided for a rotor of a wind turbine, which has an azimuth angle falling in a predetermined range,
wherein said predetermined range is within a range from 90 to 270 degrees,
wherein said performing said deicing operation includes
causing an acoustic generator provided on a tower supporting said rotor to output acoustic wave to said one or more of said plurality of blades while holding said one or more of said plurality of blades in a fine state or an inversion state in which a pitch angle thereof differs in 180 degrees from that of the fine state.

10. The wind turbine blade deicing method according to claim 9, further comprising:
detecting a first azimuth angle of a first blade out of said plurality of blades during rotation of said rotor;
holding said first blade in the fine state or the inversion state in which a pitch angle thereof differs in 180 degrees from that of the fine state when said first azimuth angle falls in said predetermined range; and
holding said first blade in a feathering state, a state between the fine state and the feathering state or a state between the inversion state in which the pitch angle thereof differs in 180 degrees from the fine state and the feathering state when said first azimuth angle does not fall in said predetermined range.

11. The wind turbine blade deicing method according to claim 9, wherein said acoustic generator does not output the acoustic wave when none of said plurality of blades has an azimuth angle within said predetermined range.

12. The wind turbine blade deicing method according to claim 9, wherein said deicing operation is performed in a state in which said rotor is stopped.

13. The wind turbine blade deicing method according to claim 9, wherein said deicing operation is performed when icing on said rotor is detected.

14. The wind turbine blade deicing method according to claim 13, further comprising: stopping performing said deicing operation when the icing on said rotor is not detected.

15. The wind turbine blade deicing method according to claim 9, wherein said deicing operation is performed when a predetermined weather condition is detected.

16. The wind turbine blade deicing method according to claim 9, wherein said deicing operation is performed regularly.

* * * * *